(12) United States Patent
Mayhew

(10) Patent No.: US 8,054,179 B2
(45) Date of Patent: Nov. 8, 2011

(54) AUTOMATIC TRACKING MOTION CONTROL SYSTEM FOR A STAGE SET

(75) Inventor: Rusty Mayhew, Carrollton, TX (US)

(73) Assignee: Production Resource Group, LLC, New Windsor, NY (US)

(*) Notice: Subject to any disclaimer, the term of this patent is extended or adjusted under 35 U.S.C. 154(b) by 275 days.

(21) Appl. No.: 11/828,722

(22) Filed: Jul. 26, 2007

(65) Prior Publication Data

US 2008/0048864 A1   Feb. 28, 2008

Related U.S. Application Data

(60) Provisional application No. 60/833,626, filed on Jul. 26, 2006.

(51) Int. Cl.
*G08B 1/08* (2006.01)

(52) U.S. Cl. .................................. 340/539.13

(58) Field of Classification Search ............ 340/539.13, 340/540, 686.1, 332, 815.4, 572.1, 825.49, 340/641; 362/231, 459; 700/19, 57–59; 315/292–295, 312; 359/298, 239

See application file for complete search history.

(56) References Cited

U.S. PATENT DOCUMENTS

| | | | | |
|---|---|---|---|---|
| 1,923,741 | A * | 8/1933 | Murdock et al. | 362/249.11 |
| 5,504,477 | A * | 4/1996 | Whitright et al. | 340/10.4 |
| 5,969,485 | A * | 10/1999 | Hunt | 315/292 |
| 6,079,862 | A * | 6/2000 | Kawashima et al. | 382/103 |
| 6,529,853 | B1 * | 3/2003 | Bauer | 702/152 |
| 6,769,790 | B2 * | 8/2004 | Fruhm et al. | 362/286 |
| 7,543,955 | B2 * | 6/2009 | Belliveau et al. | 362/231 |
| 2004/0160198 | A1 * | 8/2004 | Hewlett et al. | 315/292 |

* cited by examiner

*Primary Examiner* — Brent Swarthout
(74) *Attorney, Agent, or Firm* — Law Office of Scott C. Harris, Inc.

(57) ABSTRACT

Movable items on a stage have their position detected in three dimensions, and multiple different lights can be shined at the moving items even after they are moved. Shadowing can be detected and compensated.

13 Claims, 2 Drawing Sheets

AUTOMATIC TRACKING MOTION CONTROL SYSTEM FOR A STAGE SET

CROSS-REFERENCE TO RELATED APPLICATIONS

This application claims priority to U.S. Provisional Application 60/833,626, filed Jul. 26, 2006. The disclosure of the prior application is considered part of (and is incorporated by reference in) the disclosure of this application.

BACKGROUND

In a stage environment, such as in a Broadway style show, other play, or basically any venue where a stage is used, there are two things that must occur on the stage. First, there must be lighting, otherwise the audience would not be able to see what was going on the stage. In addition, however, many props on the stage may need to be moved at different times. For example, for different scenes, different props may be used or may be in different locations. Some shows require that the prop be moved as part of the show, and therefore the prop is dynamically moved. The movement may be done manually, or may be done via computer control.

SUMMARY

The present application describes a system that monitors movement of stage props, and automatically synchronizes movement of a controllable light beam with the actual location of the stage prop.

BRIEF DESCRIPTION OF THE DRAWINGS

These and other aspects will now be described in detail with reference to the accompanying drawings, wherein.

DETAILED DESCRIPTION

The general structure and techniques, and more specific embodiments which can be used to effect different ways of carrying out the more general goals, are described herein.

Figure 1:
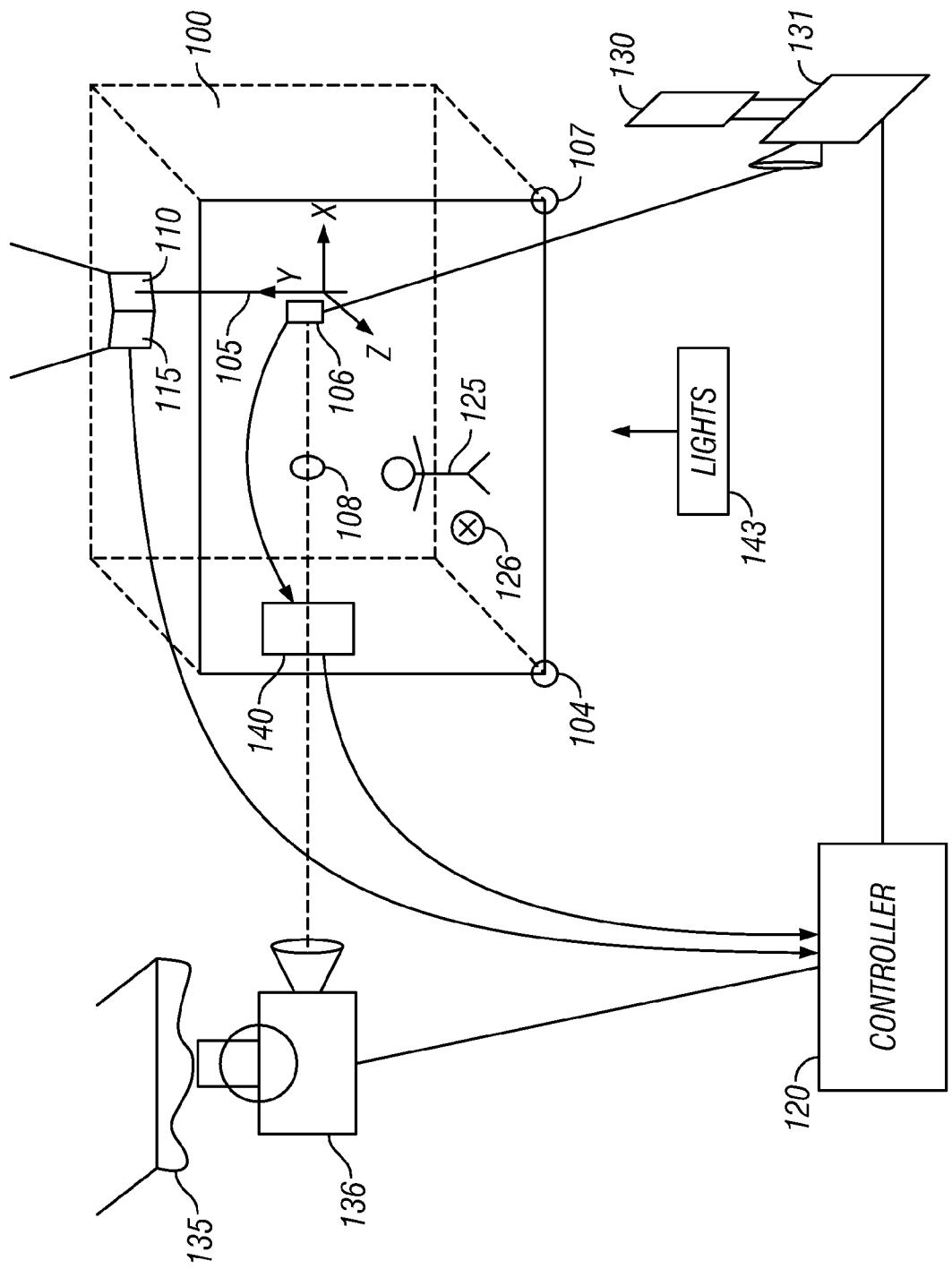
FIG. 1 shows a block diagram of the system in operation.

FIG. 1 shows a stage environment which is intended to host a Broadway show. The stage includes at least one prop shown as 105. The prop is controllable based on the motion control system. A winch 110 may control motion of the prop in the y direction, up-and-down relative to the stage. A pulley system 115 may control movement of the prop in the x and z direction, that is stage left/stage right, as well as front to back. Of course, the movement may be in any subset of these directions. In this way, the prop can be moved. The movement for the prop may be controlled by a controller 120, which can be a stage lighting controller, or can be a manual controller.

The stage may also include locations for performers, shown as 125, as well as other props which are also controllable.

The stage is also illuminated by a plurality of controllable moving lights. These lights may be controllable in pan and tilt, so that the pointing direction of the light can be controlled in a x,y,z direction. The lights are on trusses which may be located in various areas relative to the stage and pointing at the stage. For example, there may be a truss 130 at stage right, which hold a moving light 131. A truss 135 may be located at stage left, holding a moving light 136. Both of the moving lights 131 and 136 are controlled by the controller 120, from and typically via a computer at a connection such as DMX 512.

In operation, the prop 105 may be moved to any desired location. However, some of the luminaires, in the drawings 131, 136, have the task of illuminating that prop. Manual control may be used to cause the luminaires to follow the motion of the prop.

According to an embodiment, the prop 105 has an associated location detector part 106. Location detector part 106 may be any of a number of commercially available location detection mechanisms. In one embodiment, location detection part 106 triangulates between fixed points 107, 108, 109 which are placed on the stage, in order to determine the position in of the associated prop. However, other location detection devices are also well known, including orthogonal coils of the type used for medical detection, GPS, and others.

Location detection part 106 wirelessly communicates a signal indicative of either the location, or some raw signal from which the location can be determined, to a local receiver 140. The receiver 140 in turn, sends either the information or the location to the controller 120. The raw information can be, for example, coordinate information, or triangulation information between beacons.

Figure 2:
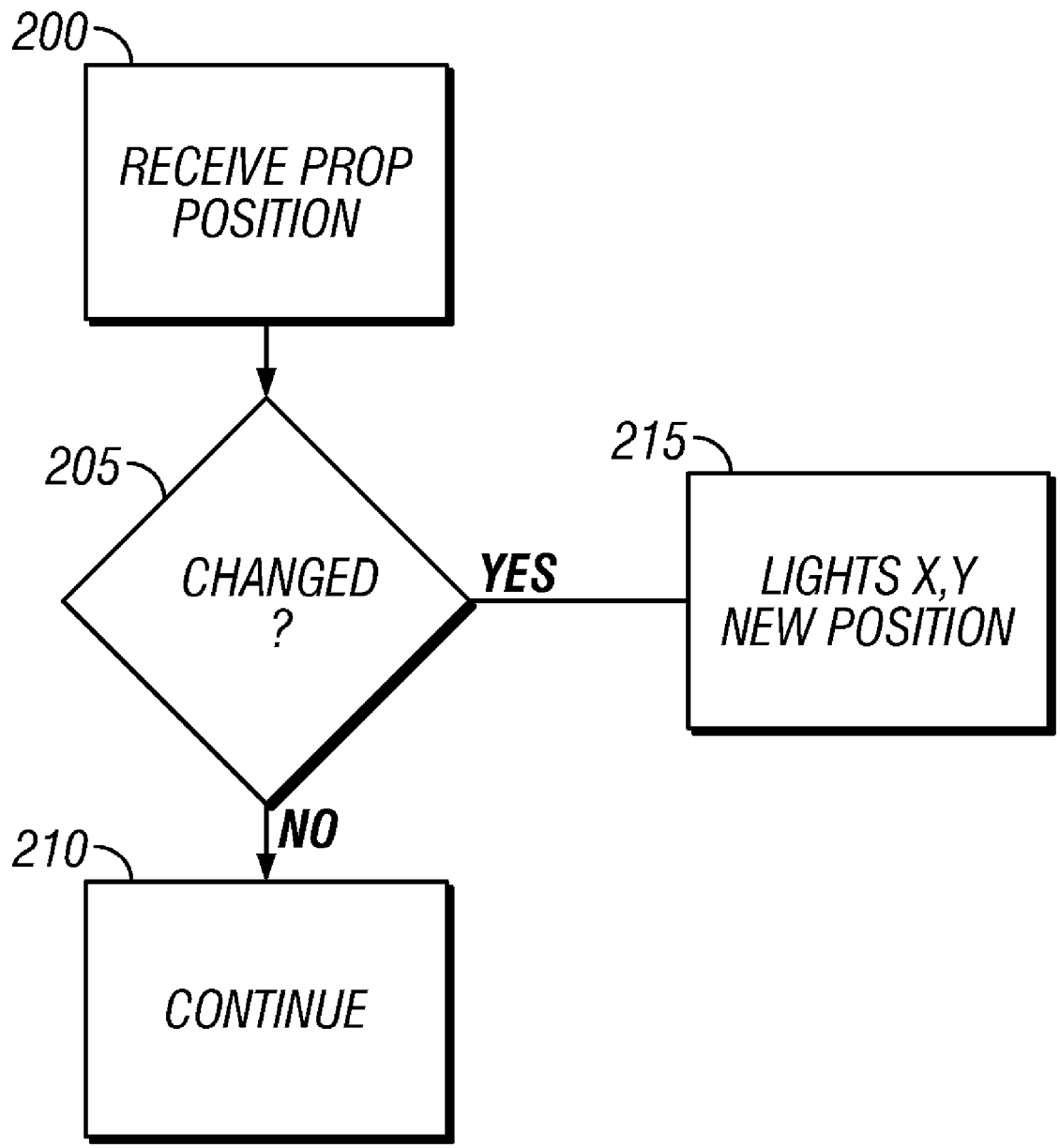
FIG. 2 shows a flow diagram.

Controller 120 therefore receives real-time information indicative of the x,y position of the prop. Controller 120 may therefore include a CPU that runs the routine shown in FIG. 2. At 200, the controller receives the prop position. 205 compares the prop position to a previously-received prop position, to determine if the prop position has changed since a previous time. If not, the controller's flow continues at 210. However, if the position of the prop has changed, then the controller calculates new pointing locations for each of the lights here 131 and 136. In general, since the lights are each in a different place, the new pointing positions of these lights will each be different for each light. In an embodiment, the flowchart of FIG. 2 may be carried out relatively frequently, for example every 300 ms. In this way, the light can track, in real-time, the prop position as it moves. When the prop position is moved manually, the lights will automatically follow the prop position. The controller may also use a computer to move the prop itself. However, because the props may be heavy devices, and use winches which are not consistent movers, the movement of the prop may not match exactly with the commanded location. This system enables the lights, which can be more precisely controlled, to exactly match the movement of the prop.

By controlling multiple lights in this way, shadowing on the prop may be minimized. For example, if the prop is illuminated by only one light such as 131, it may cast an undesirable shadow behind the prop. Illuminating the prop using multiple lights, however, is relatively difficult when done manually. The present system may avoid the shadowing and may automatically follow the props.

The above has described prop following, but it should be understood that different items on the stage, such as the performer 125, may also include a locator such as 126. A bank of lights shown as 143 may be dedicated to the performer.

In addition, the lights which are associated with each prop or performer may change as the prop or performer moves on the stage.

According to another embodiment, the controller 120 calculates which of the lights 131, 136 would produce the minimum shadowing effect on the prop, and assigns a lighting of the prop to those lights which would produce the minimum shadow effect, and adaptively changes which lights illuminate the prop as the prop moves.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the above has described using this system to follow a prop or performer, however, it can also be used to follow any other device, such as a moving vehicle or cart, or any other kind of device.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:
receiving information from a device that automatically senses its location and wirelessly reports its location, said device being a movable item reporting information indicative of a first location when located at a first location, and wirelessly reporting information indicative of a second location different than said first location, when located at said second location;
storing positions of plural different lights in a computer, where said plural different lights are in different locations and can be moved in directions to illuminate different areas; and
based on said wireless report and said positions of said plural different lights, using the computer for calculating first and second directions for at least multiple of said lights in different locations which will each point in different directions, to illuminate certain locations to point at said device; and
sending a command from said computer to said plural different lights to point in said different directions, respectively,
wherein said calculating examines multiple lights, and which of said multiple lights would produce a minimum shadowing effect on an item with said device, and selecting only some, but not all lights, including lights which would create the minimum shadowing effect to shine on said item.

2. A method as in claim 1, wherein said devices are on props on a stage.

3. A method as in claim 2, wherein said devices are on items which are movable by a winch in a direction that is vertical relative to the stage.

4. A method as in claim 2, wherein said devices are on items which are moved by a pulley in a direction that is horizontal relative to the stage.

5. A method as in claim 1, wherein said lights can be moved in pan and tilt directions to allow each of the lights to be moved in plural different positions.

6. A method as in claim 1, wherein said automatically senses its position comprises triangulating between a number of different position detecting elements.

7. A method as in claim 1, wherein said calculating a direction comprises first comparing a received position with a previously received position, and carrying out said calculating a direction only when the received position is different than the previously received position.

8. A method as in claim 1, wherein said calculating comprises calculating pointing directions for a plurality of different lights, where each of said pointing directions for each of said different lights are different.

9. A method as in claim 1, wherein said movable items are items driven by winches and pulleys.

10. A method as in claim 1, wherein said movable item is a performer.

11. A method, comprising: receiving a signal from a device that automatically senses a location of said device and wirelessly reports its location, said signal being representative of information indicative of a first location when located at a first location, and representative of a second location different than said first location, when located at said second location; receiving the wireless report of location in a computer; storing positions of plural different lights, which can be moved in directions to illuminate different areas in said computer; and based on said wireless report and said positions, using said computer for calculating a direction for at least one of said lights to point at said device including calculating which lights would form a shadow, and selecting only some of said lights that illuminate the item based on minimizing the shadow.

12. An apparatus, comprising: a lighting controller, storing a plurality of information points indicative of a plurality of positions of remotely-located lights, and also receiving at least one signal indicative of a position of a movable item, said lighting controller being a wireless controller calculating pointing positions for at least two of said remotely located lights based on said position of said movable item, such that said at least two lights will each point at said movable item, where said at least two remotely located lights are in separate positions, and said at least two pointing positions are separate pointing positions, and producing a signal which causes said at least two lights to point in said at least two separate pointing positions, wherein said lighting controller calculates an amount of shadow that will be caused by illuminating by different lights, and selects only some of said lights based on said calculating.

13. A method, comprising:
receiving a signal from a movable item, which signal is indicative of a current position of the movable item;

storing a plurality of positions of lights in a computer, wherein at least two of the positions of lights are non-parallel to one another;

based on said signal indicative of the current position, and said light positions, using the computer for calculating an amount of shadowing that will be caused by different groups of different lights illuminating the movable item; and using the computer for selecting one of said different groups which includes only some but not all of said lights to illuminate the movable item, and positions for those lights to illuminate the movable item, based on said calculating and controlling said lights to illuminate the movable items by moving to said positions.

* * * * *